Figure 1:
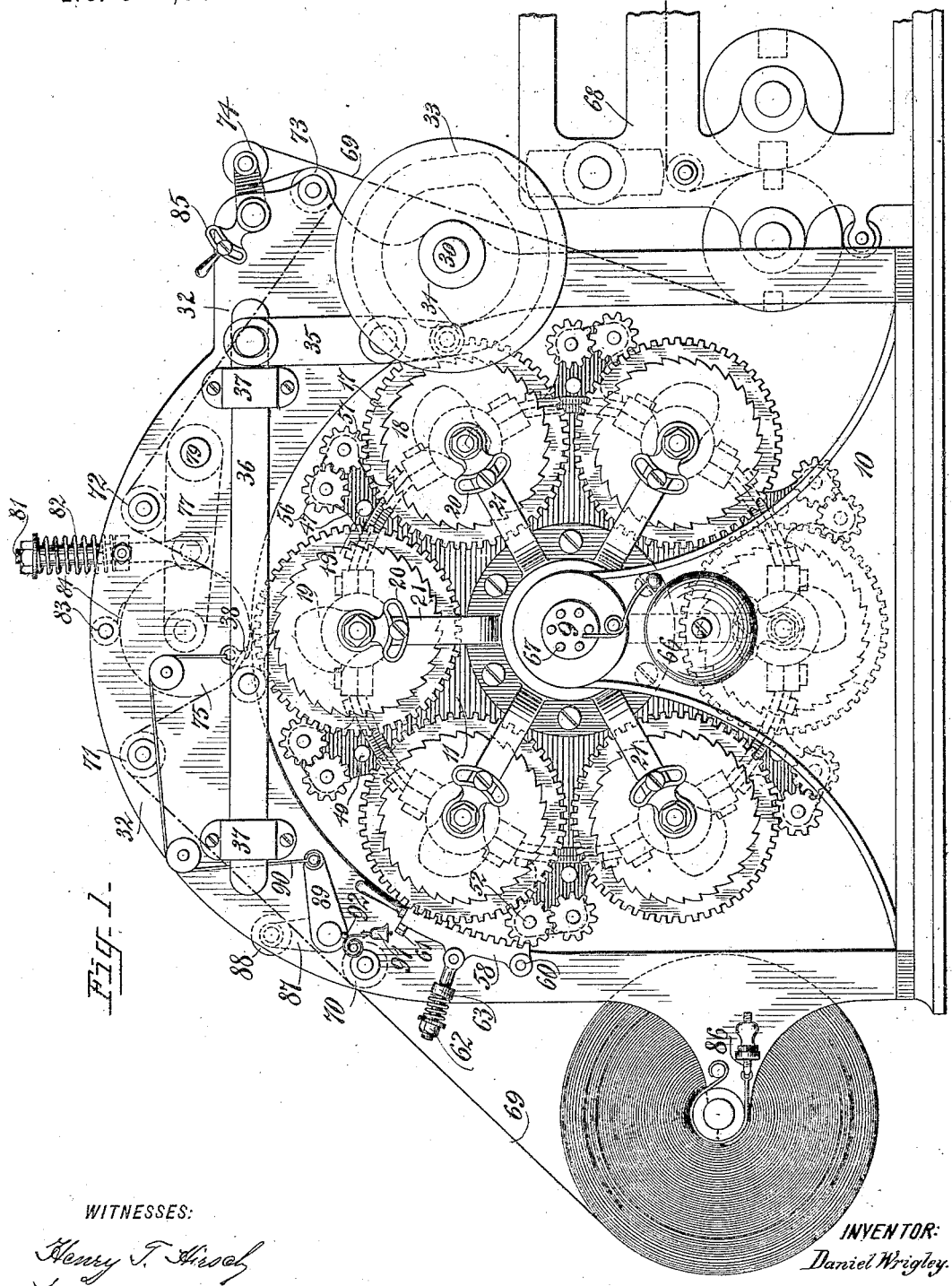

(No Model.) 7 Sheets—Sheet 1.
D. WRIGLEY.
ADDRESSING MACHINE.

No. 547,532. Patented Oct. 8, 1895.

WITNESSES:
Henry T. Hirsch
W. H. Capel.

INVENTOR:
Daniel Wrigley.
BY Townsend & Decker
ATTORNEYS.

(No Model.) 7 Sheets—Sheet 3.

D. WRIGLEY.
ADDRESSING MACHINE.

No. 547,532. Patented Oct. 8, 1895.

WITNESSES:
Henry T. Hirsch
W. H. Capel

INVENTOR
Daniel Wrigley.

BY
Townsend & Dethir
ATTORNEYS.

(No Model.) 7 Sheets—Sheet 4.

D. WRIGLEY.
ADDRESSING MACHINE.

No. 547,532. Patented Oct. 8, 1895.

WITNESSES:
Henry T. Hirsch
Wm H. Capel

INVENTOR
Daniel Wrigley

BY
Townsend & Decker
ATTORNEYS.

(No Model.) 7 Sheets—Sheet 5.
D. WRIGLEY.
ADDRESSING MACHINE.
No. 547,532. Patented Oct. 8, 1895.
*Fig. 5.*
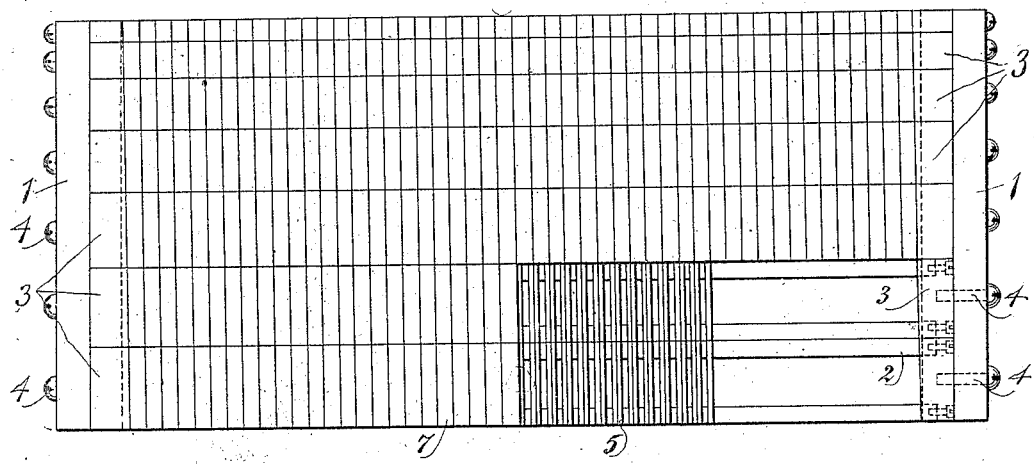
*Fig. 6.*    *Fig. 7.*    *Fig. 8.*
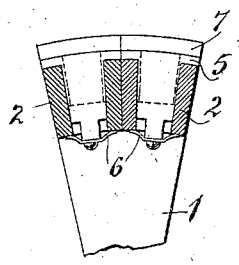 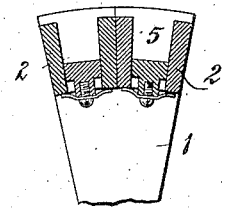 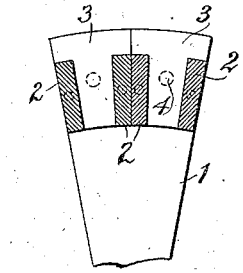
*Fig. 9.*      *Fig. 10.*
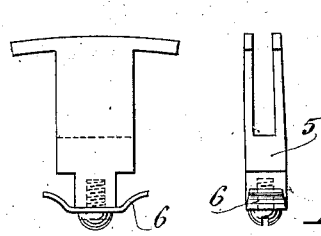 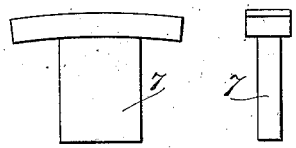
*Fig. 11.* *Fig. 12.*
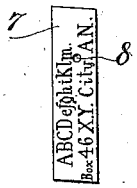 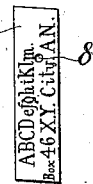 
WITNESSES:
Henry T. Hirsch
Wm H. Capel
INVENTOR
Daniel Wrigley
BY
Townsend & Decker
ATTORNEY (No Model.) 7 Sheets—Sheet 6.

D. WRIGLEY.
ADDRESSING MACHINE.

No. 547,532. Patented Oct. 8, 1895.

WITNESSES:
Henry T. Hirsch
W. T. Capel

INVENTOR
Daniel Wrigley.
BY Townsend & Decker
ATTORNEYS.

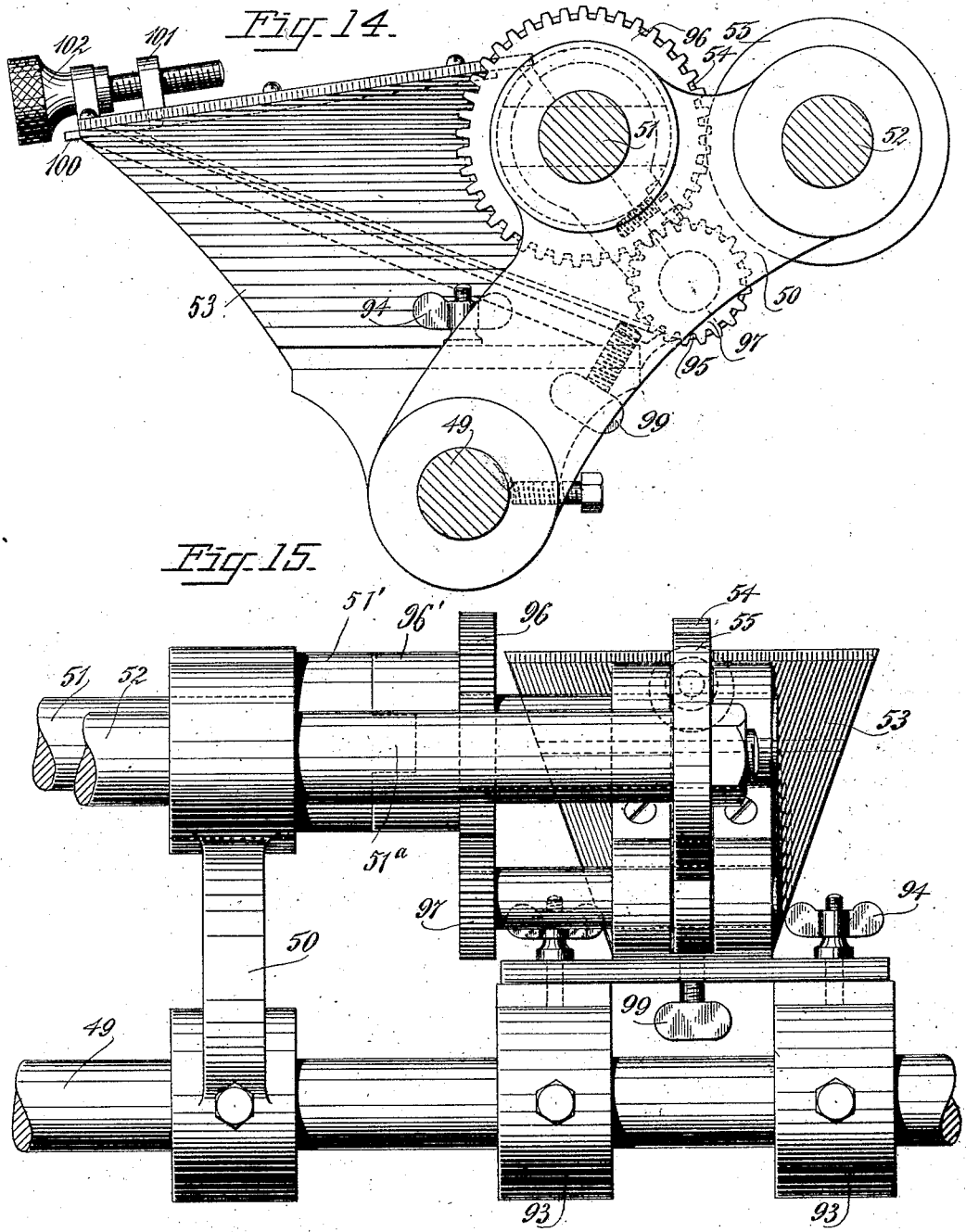

UNITED STATES PATENT OFFICE.

DANIEL WRIGLEY, OF NEW YORK, N. Y.

ADDRESSING-MACHINE.

SPECIFICATION forming part of Letters Patent No. 547,532, dated October 8, 1895.

Application filed February 25, 1895. Serial No. 539,710. (No model.)

*To all whom it may concern:*

Be it known that I, DANIEL WRIGLEY, a citizen of the United States, and a resident of New York, in the county of New York and State of New York, have invented a certain new and useful Improved Addressing-Machine, of which the following is a specification.

My invention relates to machines for printing addresses upon wrappers for various things, but particularly upon wrappers for newspapers and periodicals. This machine is designed to print the addresses upon the wrappers before they are placed upon the articles to be wrapped, and, though I prefer to do this printing upon a web of wrapping-paper as it is fed through the machine from a roll, yet I may print upon sheets previously cut to the required length.

The machine is specially intended for use in conjunction with the great presses on which the enormous editions of the modern papers are printed, which editions it is necessary to get out in as short a space of time as possible. An edition generally includes, with the local circulation, a large number of papers which must go through the mails, and it is essential that the mail edition should be gotten off with the greatest dispatch.

Automatic wrapping-machines have already been produced which greatly facilitate the work of getting off said mail edition, and addressing-machines have been suggested for use in conjunction therewith. So far as known to me, however, no such addressing-machine has yet been successfully operated in connection with a wrapping-machine and a great modern press and in a manner to take care of the product thereof as fast as produced.

My machine is made to carry a sufficient number of addresses to address the entire mail edition of each issue in one continuous run and to deliver the addressed wrappers to a wrapping-machine which takes the papers from the press, so that by the conjoint operation of the press, the addressing-machine, and the wrapping-machine the papers issue ready for the mail.

My machine is also constructed so that by the use of inks of different colors batches of papers intended for different cities or to go over different routes may be readily distinguished from each other and separated as they issue from the wrapping-machine.

My invention consists in an addressing-machine for printing addresses directly upon the wrapping-paper from address-forms mounted upon a movable form-carrier in a manner to be successively reciprocated by means within the carrier to and from the printing position as they reach a predetermined position in the line of travel.

My invention also consists in an addressing-machine having a carrier in which are mounted a series of drums, each carrying a number of addresses and each drum individually movable until all the addresses thereon have been used, when the carriage is advanced and the addresses on the next drum are printed.

My invention further consists in an addressing-machine having a carrier provided with a series of rotary drums carrying address-forms, in combination with ink-fountains mounted on said carrier and means for inking a number of forms on a drum as the carrier advances into the printing position.

My invention also consists in an ink-fountain for addressing-machines constructed to retain the supply of ink in whatever position it may be and to return to the fountain any surplus ink left on the inking-wheel.

My invention further consists in the construction of the various features of my addressing-machine and in the arrangement and combination thereof, as hereinafter set forth in the description and specified in the claims.

Figure 2:
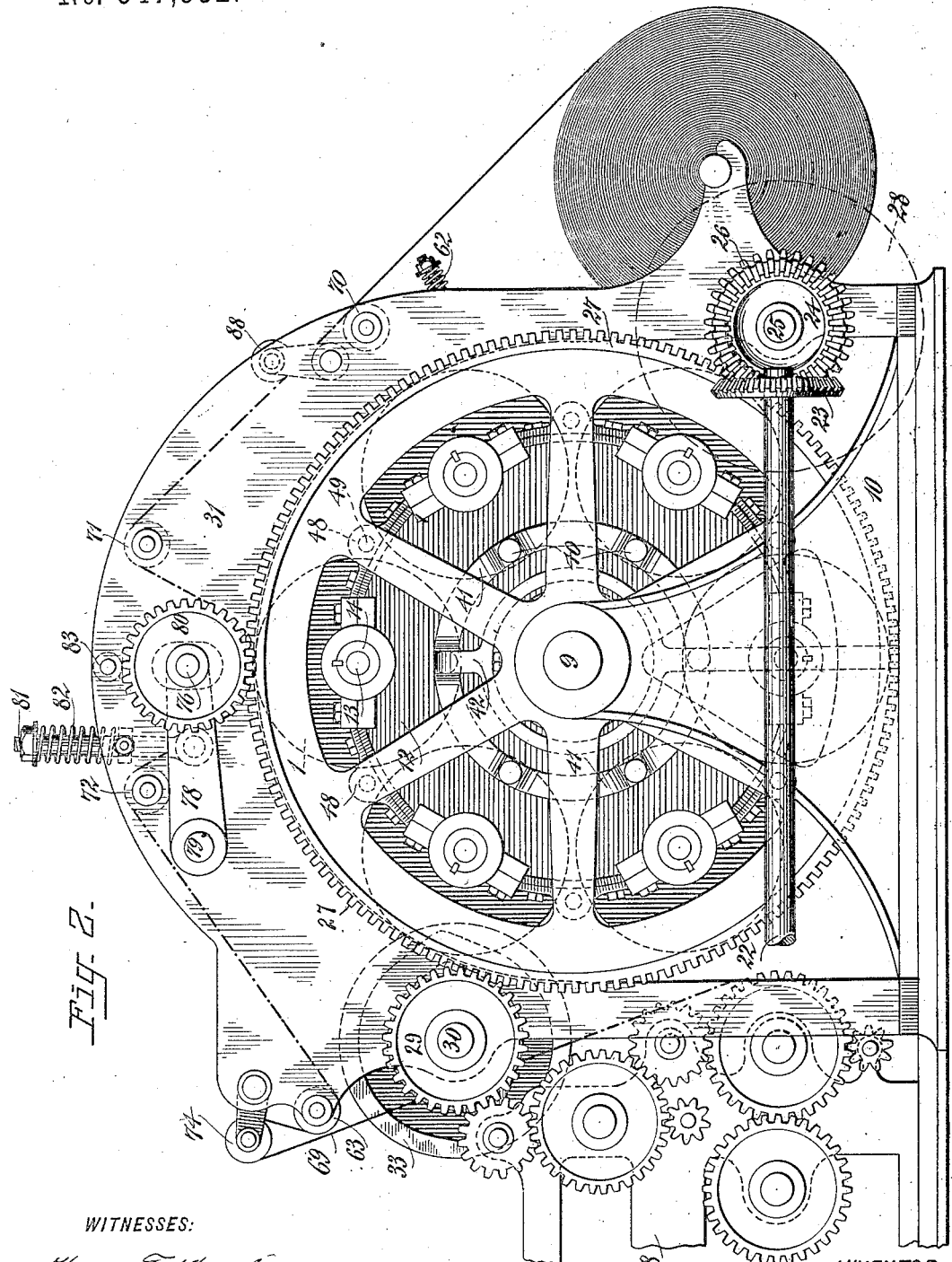
Figure 3:
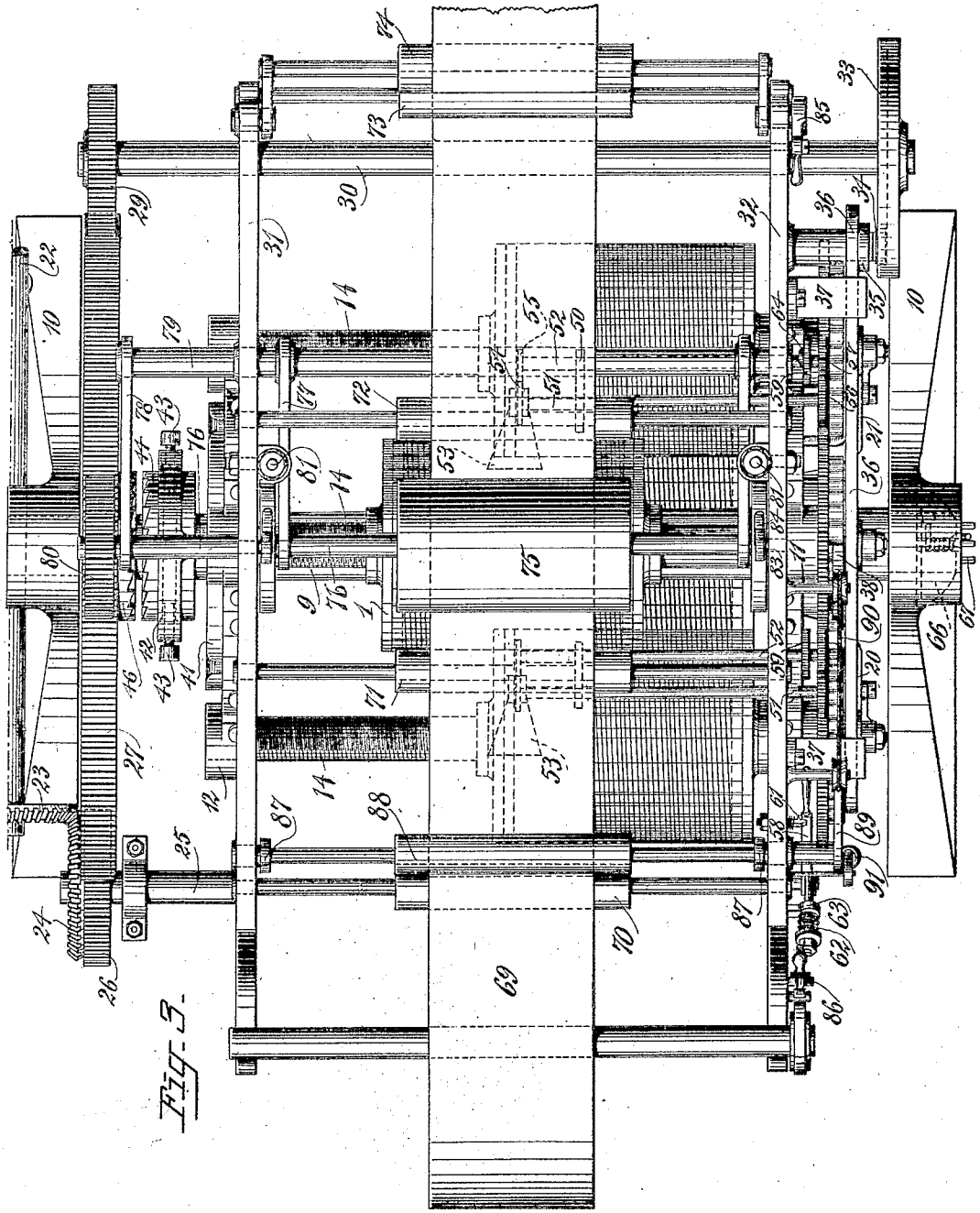
Figure 4:
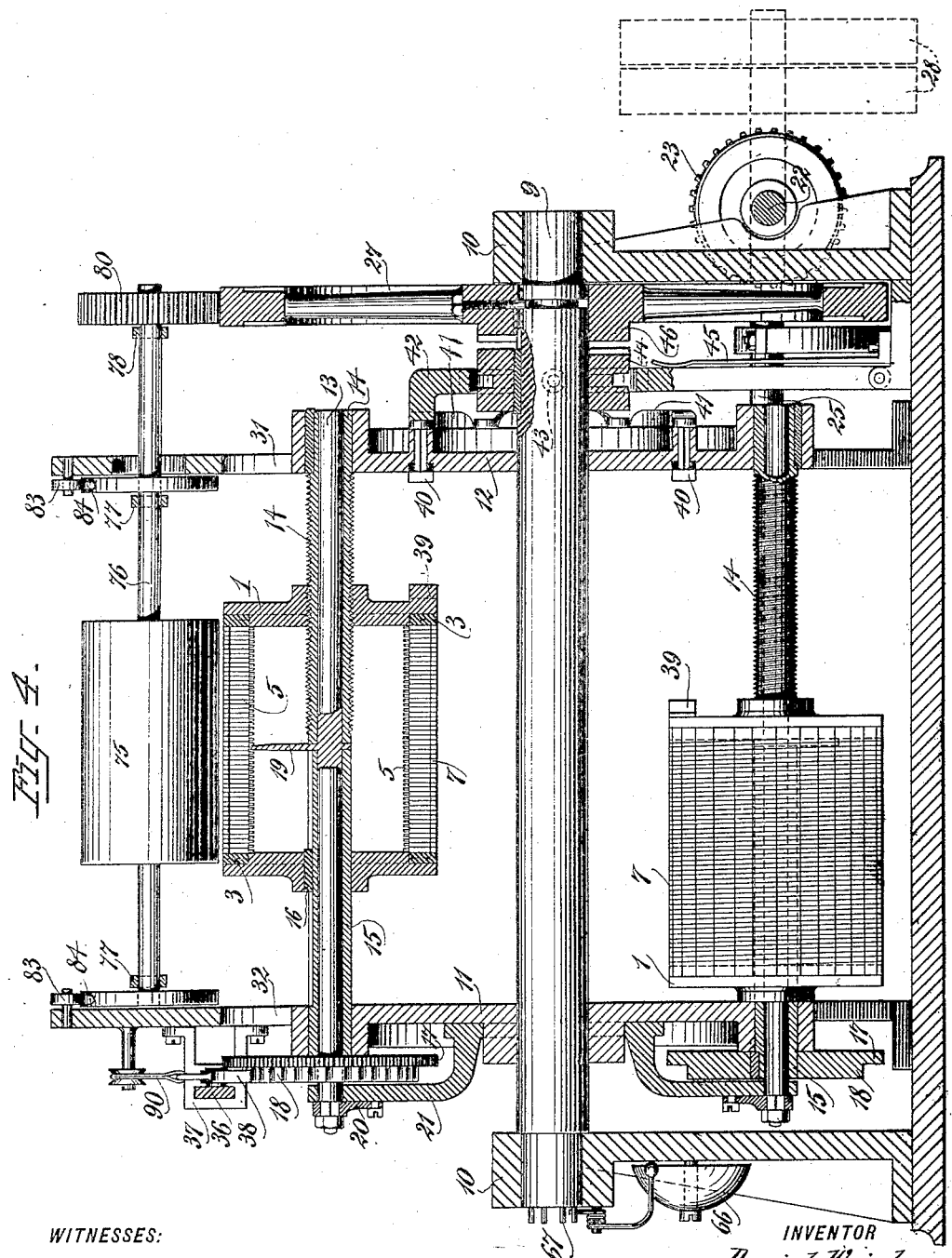
Figure 16:
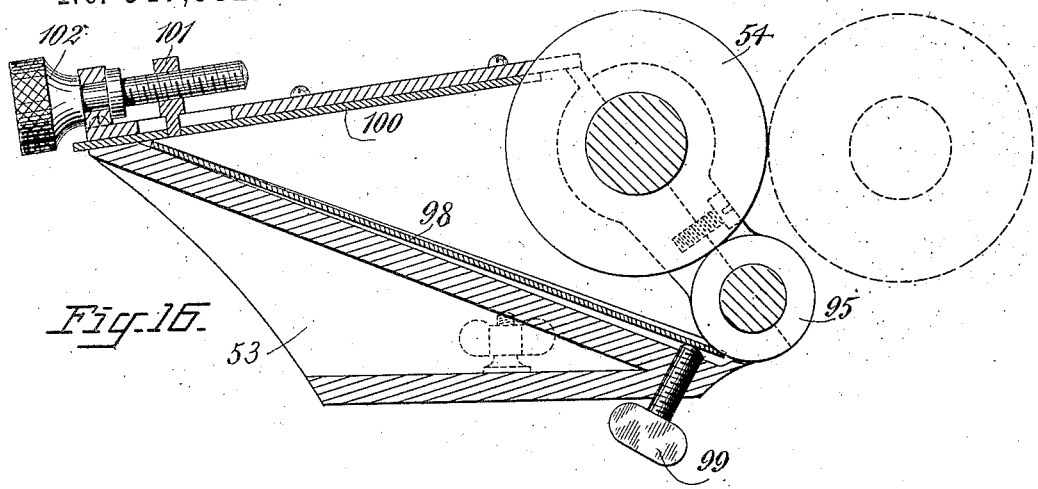
Figure 13:
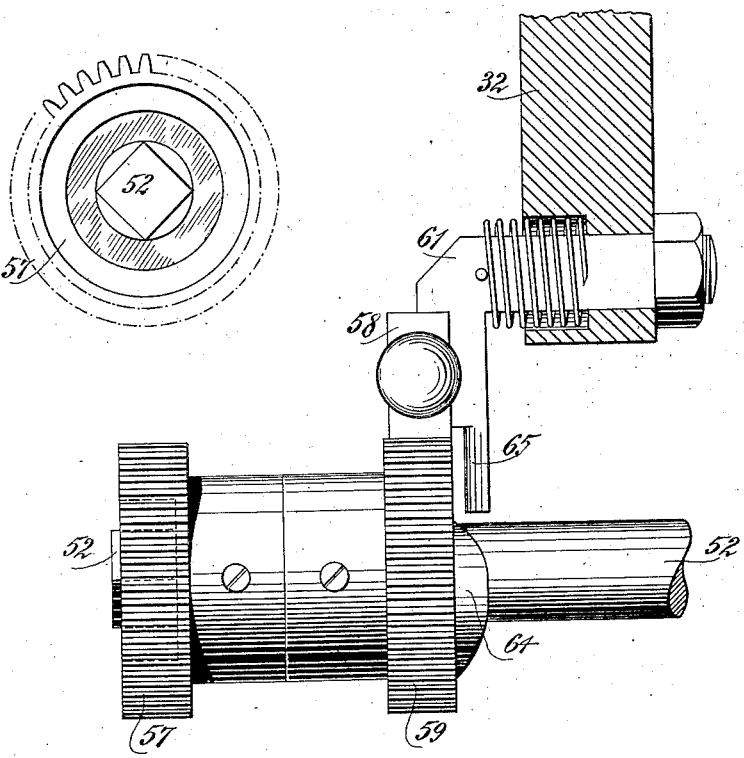

In the accompanying drawings, forming a part of this specification, Figure 1 represents in elevation the operator's side of my improved addressing-machine. Fig. 2 represents in like manner the opposite or gear side. Fig. 3 represents a plan of the machine. Fig. 4 represents a vertical transverse medial section showing some of the parts in full and omitting nearly all that is back of the plane of section. Fig. 5 represents a plan of one half of one of the address carriers or drums. Fig. 6 represents in transverse section a portion of said drum, showing address-forms and form holders or seats in place. Fig. 7 is a similar representation with the address-forms removed. Fig. 8 is a similar representation with the address-forms and form-holders moved. Fig. 9 represents one of the form-holders in side and edge view, respectively. Fig. 10 is a like representation of an address-form. Fig. 11 is a plan of an address-form with an address indicated thereon. Fig. 12 shows a tool of convenient form for removing any one of the address-forms. Fig. 13 is a detail view of the tripping mechanism for the rack, which causes the inking of the first few forms as a form-carrier is moved into printing position. Figs. 14, 15, and 16 are full-size views of the ink-fountains, the latter figure being a section taken in the plane of the ink distributing and returning wheels.

In the preferred form of my addressing-machine, as illustrated in the drawings, I use a number of form-carriers mounted upon a suitable rotary support and locate the propelling apparatus for the form-carriers upon a framework, which also carries the roll of wrapping-paper, the guiding-rolls therefor, the impression-wheel, and other necessary parts co-operating in feeding the wrapping-paper through the machine. Each form-carrier is in the form of a cylinder or drum, the heads of which are indicated at 1, and the surface of which is provided with slots extending lengthwise thereof for the reception of the address-forms. These slots, as shown in Figs. 5 to 8, are formed by means of bars 2, connected at their ends by plates 3, the bars and plates forming frames, which are mounted removably upon said heads. The ends of said frames rest upon a shoulder formed on the inner faces of the heads, as indicated in Figs. 4 and 5, and are held in place by means of screws 4. In these frames are mounted the form-holders or seats 5, which are constructed substantially as indicated in Figs. 6, 7, and 9. At their upper ends are formed projections, by which they rest upon the bars 2, and at their lower ends they are provided with projections, to which are connected plate-springs 6, that bear upon the under sides of the bars 2. The holders are formed of spring metal and their sides are bent slightly toward each other, so that they may firmly hold the forms.

As indicated in Figs. 4 and 5, the form-holders or seats are located side by side in the slots of the drum, and the address-forms 7, which are of the shape shown in detail in Figs. 10 and 11, are inserted in said holders, as indicated in Fig. 6. The forms are provided with suitable means for withdrawing them—as, for instance, by tapping into the face thereof in any convenient location a socket, as 8, Fig. 11, in which a suitable tool, as indicated in Fig. 12, may be inserted.

The forms, as clearly indicated, are placed end to end in a spiral about the form-carriers and occupy the entire space from one head to the other of said carriers. To provide the proper support for the forms nearest the heads, the plates 3, forming the ends of the removable frames, vary successively in thickness from the width of the shoulder at the start to the width of the shoulder plus the width of a form at the finish. I prefer to arrange the forms in the manner shown, as in that way more of the surface of the cylinder can be utilized than if the forms were placed side by side in their spiral succession, though I do not intend to limit myself to placing them end to end. From this manner of mounting the form-holders it will be seen that they are capable of being moved from the interior of the cylinder or drum so as to protrude one form beyond the others, the springs 6 acting to return them to place. Any number of the form-carriers just described may be operated together or the machine may be constructed with but one of them.

The support for the form-carrier in the machine, as illustrated, consists of the axle 9, journaled at its ends in suitable brackets 10 and having rigidly mounted thereon end plates 11 and 12. Upon these plates the form-carriers are mounted in a manner to allow a rotary and a longitudinal progressive motion. This is accomplished in respect to each drum by mounting a shaft, as 13, in each head and about one end of this shaft placing a hollow screw-threaded shaft 14, which is keyed or otherwise rigidly fixed in a suitable bearing in the end plate 12, and placing upon the other end of said shaft 13 a hollow shaft 15, which is mounted to rotate in a suitable bearing upon the head 11. Upon this compound shaft a form-carrier is mounted by means of a nut in one of its heads engaging with the screw-threaded shaft, while the other head engages the rotary shaft 15 by means of a groove and spline. The groove I have shown formed in said shaft and the spline 16 fixed in the head of the drum. Obviously, the parts of this sliding connection may be reversed, if desired.

To provide a rotary motion for the form-carrier, a gear consisting of a pinion 17, associated with a ratchet-wheel 18, is mounted upon the end of the hollow shaft 15, as indicated in Fig. 4, and during the printing operation the ratchet-wheel is turned, which, in causing the shaft 15 to rotate, carries the drum about with it, causing the latter to crawl along the shaft 14. It may here be said that the thread of the shaft 14 is identical in pitch with the spiral formed by the address-forms upon the drum.

To accomplish the reciprocation of the address-forms, a cam is located within the drum in such a manner that as the drum is rotated and each form approaches a certain point said cam shall act upon the form-carrier and cause the form to be protruded beyond the surface of the other forms. Such a cam, as 19, I preferably mount, as indicated in Figs. 1 and 4, upon the shaft 13. I also provide for the adjustment of this cam preferably by extending the shaft 13 beyond the ratchet-wheel 18 and attaching thereto an adjusting-sector 20, which may be rigidly held in any adjusted position by means of a screw passing therethrough into an arm, as 21, attached to the end plate 11. The arms 21 are preferably integrally connected with one another and constitute a spider located about the hub of the end plate 11, as indicated in Figs. 1 and 4. I have shown six of these form-carriers mounted, as above described, upon the support, of which the essential features are the end plates 11 and 12.

The power for operating my addressing-machine may be applied in any suitable manner; but when said machine is used in connection with a wrapping-machine and printing-press it is preferred to drive it from the press mechanism by means of the shaft 22, carrying at its end a bevel-gear 23, meshing with a bevel-gear 24, mounted upon the end of shaft 25, upon which is also mounted a pinion 26, meshing with the main motor-gear 27, which is loose upon the shaft 9.

When the machine is to be used alone or when it is desired to drive it from some other power than that above mentioned, it may be belted to any suitable power by extending the shaft 25, as indicated in Figs. 2 and 4, and mounting thereon the usual fixed and idle pulleys 28. The ratchet-wheel 18 is driven from the motor-gear 27 by means of a pinion 29, mounted upon a shaft 30, which is journaled in suitable bearings in the sides 31 and 32 of the frame of the machine and carries at its other end a double box cam 33. In the raceway of this cam is located a roller 34 upon the end of a lever 35, which is pivoted on a stud projecting from the frame 32 and engages, by means of a slot at its other end, a stud upon the bar 36, mounted to slide in suitable bearings 37, connected to the frame 32. To this bar 37 is pivoted a pawl 38, which engages with the ratchet-wheels 18 for the rotation of the form-carriers. Each form-carrier is rotated step by step by means of this ratchet mechanism until all its forms have been printed from, at which time, in its progressive movement, it has reached the end plate 12, and as the last form leaves its impression upon the wrapping-paper a cam projection 39 upon the advance head of the drum strikes the head of a pin 40, mounted in a sliding bearing in the end plate 12. There are as many of these pins as form-carriers, and the outer head of each rests in a notch or space in a detent-ring 41, formed upon or secured to the outer surface of the end plate 12. In the notches or spaces in this ring a projection or detent upon the end of the clutch-lever 42 is adapted to rest. This lever 42 is pivoted or hinged at its lower end to the base of the machine and is connected in the usual manner by ring and pins 43 to a clutch member 44, splined or feathered upon shaft 9. A suitable spring—as, for instance, that shown at 45—is provided for forcing the detent portion of said lever into the notches of ring 41 and for holding the clutch members apart. As will be seen, when the pins 40 are forced outward by the cams 39 on the drums the gear 27 will be coupled to the shaft 9 by means of its clutch member 46 being engaged by the clutch-member 44, and the support for the form-carriers will be rotated until the lever 42 drops into the next notch of the ring 41, when the clutch will release the gear 27 and stop the rotation of said support. This motion of the support brings another form-carrier into the printing position.

The inking of the forms constitutes an important feature of my invention, since it is desirable, for reasons hereinafter set forth, that the fountains should be mounted upon the form-carrier support, and fountains so mounted must be specially constructed to prevent the ink from flowing or dripping therefrom as they assume the different positions during the rotation of said support.

Upon the end plate 11 in proximity to each form-carrier is mounted a bracket 47, in which and in a bracket 48, mounted upon the end plate 12, as indicated in Fig. 2, is fixed a shaft 49. To this shaft is rigidly secured a bracket-bearing 50, in which and in the brackets 47 are journaled shafs 51 and 52. Upon the shaft 49 the ink-fountain 53 is mounted. The shafts 51 and 52, which carry, respectively, the ink-distributing wheel 54 and the inking-wheel 55, are rotated in unison by means of the pinions 56 and 57, mounted, respectively, upon their outer ends at the outside of the bracket 47. The details of the ink-fountain will be hereinafter fully set forth. In the present stage of the description suffice it to say that the inking-wheel 55 is of the same breadth as the forms and is so located with respect to the form-carriers as to rest in the initial position of the latter upon the first or just in advance of the first form, so that as the form-carriers are rotated and advance said wheel shall roll over the forms in succession.

The inking-wheel receives its rotation during the printing operation through the gear 57, which is in mesh with the gear 17, and its rotation is imparted through gear 56 to the ink-distributing wheel. It is necessary to provide for inking the initial forms upon each form-carrier as said carrier is moved by the rotation of its support from its idle position into the printing position. As one means and as I consider it the preferable means for accomplishing this purpose, I mount upon the frame 32 a rack 58 in a position such that it will engage a pinion 59, mounted upon the shaft 52, just inside of the pinion 57, as seen in Figs. 3 and 13. By this construction, as indicated in Fig. 1, the gear 59 upon the advance movement of the form-carrier support will roll along rack 58, thereby rotating the inking-wheel and imparting rotation through its associate gear 57 to the form-carrier through its gear 17 and to the ink-distributing wheel through its gear 56. The rack 58 is made of such length that upon the inking of the proper number of forms the pinion 59 will leave it, so that the first form thus freshly inked will be in the proper printing position upon the arrival of the form-carrier at the printing position. This rack may be mounted in many ways; but I prefer to so mount it that as the last form-carrier passes it it will be thrown out of the path of the succeeding gears 59, thereby preventing the useless inking of the forms in the event of the machine being allowed to rotate after the printing has been completed. I have shown said rack as pivoted at 60 to the frame 32 and held in operative position by means of a pin 61, spring-seated in the frame 32, as indicated in Fig. 13. To the rack is also pivoted a rod 62, which passes through a puppet-head 63, located in said frame, and is provided with a head, between which and the puppet-head is located a spring for retracting said rack.

For releasing the rack I provide a cam projection 64 upon the gear 59, as indicated in Figs. 3 and 13. This projection engages with an extension 65 of the pin 61, which lies behind the rack 58, as indicated in Fig. 13. The cam 64 for acting upon the pin 61 to allow the release of rack 58 is located upon that pinion 59 which is associated with the last one of the series of form-carriers. A suitable handle, as indicated, is formed upon the rack 58 for placing it under the retaining projection of pin 61 when the machine has been fitted for printing.

To warn the attendant of the movement of the form-carrier, a bell, as 66, is mounted upon one of the brackets 10, as indicated in Figs. 1 and 4, the hammer of which is actuated by suitable projections, as pins 67, fixed in the end of shaft 9. As one form-carrier is replaced by another in the regular operation of the machine, one tap only upon the bell is produced, and as the last form upon the last form-carrier is printed from the last one of the pins 40 is forced outward to fill the last notch in the ring 41, so that the form-carrier support is then free to rotate until the operator throws the machine out of gear. This stage of the operation will be indicated to the attendant by two or more taps upon the bell 66. In resetting the form-carriers they may be rotated back to starting position in any suitable manner, and I simply show one means which may be adapted to this end.

As indicated in Fig. 13, the gear 57 may be counterbored and the end of shaft 22 squared for the reception of a suitable crank by which the shaft 15 may be readily rotated in the reverse direction.

In the drawings I have indicated the addressing-machine as associated with a wrapping-machine, a portion of which is indicated at 68. When thus associated, the paper-feeding mechanism of said wrapping-machine is utilized for drawing the wrapping-paper 69 from its roll; but when the machine is to be used independently of a wrapping-machine similar feeding-rolls will be mounted upon the frame of the addressing-machine.

The roll of wrapping-paper is indicated as supported in suitable open brackets upon the frames 31 and 32, while the web extends from said roll over the guide-rolls 70, 71, 72, 73, and 74 to the feeding-rolls. As the paper passes from the guiding-roll 71 to 72, it passes under the impression-roller 75. This roller may be mounted in a rigid manner in the frame of the machine, though I prefer, for the sake of producing clearer and more perfect impressions, to mount this roller so that it will have a slight reciprocating movement. The roller may also be idle and have only such motion as it partakes from the moving web; but it is preferable to rotate this roller positively and at the same speed as that of the forms co-operating therewith. The preferred manner of mounting and operating said roller is clearly indicated in the drawings, which illustrate it as carried by a shaft 76, journaled in the ends of arms 77 78, mounted upon a rock-shaft 79, journaled in the frames 31 32. Upon the outer end of the shaft 76, which passes through a suitable aperture in the frame 31, is secured a pinion 80, which meshes with the gear 27. To the arms 77 are connected rods, as 81, which pass through suitable puppet-heads in the frames 31 and 32 and are provided with heads, between which and the puppet-heads are located retracting springs 82, as indicated in Figs. 1 and 2. Upon the studs projecting from the frames 31 and 32 are journaled rollers 83, against which, under the influence of springs 82, are held wheels mounted upon the shaft 76 and bearing cams 84. These cams are of the same length as the address-forms, and as an address-form is protruded the said cams ride under rollers 83 and force the impression-roller and the paper down into engagement with the protruded form, and as the printing from that form is completed the cams pass from engagement with the rollers 83 and the impression-roller recedes. The reciprocation of the impression-roller is not sufficient to withdraw the gear 80 from engagement with the gear 27.

In starting up the machine it is necessary or desirable in order to locate the address in the proper position upon each wrapper to be formed from the web to provide a regulating or gage roller, as 74, by which the distance between the point of printing and the point of perforating or severing the wrappers from the web may be varied. This roller 74 is mounted in arms pivoted upon the frames 31 32, to one of which arms or to the stud bearing the same is connected a sector 85, provided with means for retaining it in any adjusted position. It is also advisable to regulate the rotation of the paper-roll, which may be done by any suitable form of retarder, as the strap-brake indicated at 86. In such an addressing-machine some means should be provided for stopping its operation immediately upon the breaking of the paper, and I have illustrated one of the many ways in which this may be done. In suitable arms, such as 87, pivoted to the frames 31 and 32, I mount a rocking roller 88, which shall rest lightly upon the web of paper between guiding-rolls 70 and 71. To one of the arms 87 or to the stud bearing the same, I attach an arm 89, from the free end of which a cord 90 is passed over suitable pulleys, as indicated in Figs. 1, 3, and 4, to the pawl 38. Upon the breaking of the paper the roll 88 will rock forward and draw the pawl from engagement with the ratchet-wheel, thereby stopping any and all movement of the form-carriers and their support. The tripping of the pawl may be signaled to the operator in any suitable way; but as one convenient way of so doing I have shown a bell, which may be sounded by the engagement of a pin 92, projecting from the arm 89 into engagement with the spring-support of the bell 91.

The operation of the machine may be briefly stated as follows: The machine having been once started, the gear 27 is in constant rotation, likewise the cam 33 and the impression-roller 75. As the cam 33 rotates, the bar 36 is reciprocated, and the pawl 38, being carried thereby, rotates the form-carrier with whose ratchet-wheel it is engaged step by step until the last form thereon is printed from, when the cam 39 on the advance head of said carrier forces the pin 40 against the lever 42, thereby engaging clutch member 44 with the one 46, carried by the gear 27, when the shaft 9 will be rotated until lever 42 drops into the next notch in the ring 41, when the clutch becomes uncoupled and the rotation of shaft 9 is stopped, bringing a fresh form-carrier into printing position. As shaft 9 starts into rotation, gear 59 rolls along rack 58. The inking-wheel and the ink-distributing wheel, together with the form-carrier associated therewith, are rotated to ink the initial forms upon the new form-carrier. Once in the printing position, the pawl immediately acts to rotate it step by step, and as each new form approaches the printing-point the lower end of its support or seat rides upon the surface of cam 19 into co-operation with the impression-roller, depressed at that instant by means of the cams 84, the movement of the form-carrier due to the ratchet mechanism being uniform with that of the impression-roller. The parts of the machine are so constructed and their operation with relation to one another so timed that a definite length of wrapping-paper, sufficient for one or more wrappers, passes through the machine while one form-carrier is being replaced by another. Therefore, if the machine is operating in connection with the wrapping-machine, there will be one or more papers without addresses to indicate the interval between successive form-carriers. I also propose to make this interval more easily perceivable by using different-colored inks in the different fountains, so that the addresses printed from one cylinder being in a certain color indicate that the papers printed from that cylinder are intended to go in a certain direction or to a certain place and must be separated from those papers printed from the succeeding cylinder with a different-colored ink, which ink indicates that the papers on which it appears are to go in another direction or to another place. The bell 66 also indicates the shifting from one drum to another. Where it is desired to use but one kind of ink, but one fountain may be employed and that located upon the frame of the machine in suitable position for its inking-wheel to roll upon the successive form-carriers as they are brought into printing position; but for the purpose of using different-colored inks and to provide a fountain for each form-carrier, so as to insure perfect co-operation between the inking-wheels and the forms, I mount the ink-fountains upon the form-carrier support, substantially as shown and described above. I prefer, also, to mount the ink wells or fountains upon the rods 49 in such a manner that they may be readily removed for cleaning and refilling. One way of doing this is illustrated in Figs. 14 and 15, wherein a suitable seat consisting of two brackets 93, keyed or otherwise secured to the rod 49, is provided, and upon this seat, by means of studs and thumb-screws 94, I mount the ink-well 53. This ink-well consists of a prismatic-shaped receptacle, in one wall of which a slit is formed for the reception of the ink-distributing wheel 54 and the ink-returning wheel 95. These wheels are supported upon short shafts journaled in bearings at the sides of said slit and provided with gears 96 and 97, respectively, which mesh with one another. Associated with the gear 96 is a clutch member consisting of a notched hub 96', which co-operates with a corresponding member 51' upon the end of shaft 51 having a projection 51$^a$ fitting into said notch. By means of this clutch or slip joint the fountain is rendered easily removable from the shaft operating the wheels running in the slit, as described. The inking-wheel 55 has no direct connection to the fountain, but it is so located as to co-operate with the distributing-wheel to receive its supply of ink. The fountain should be sealed in a manner to prevent the ink from escaping therefrom no matter what the position of the fountain may be. One means of sealing it is illustrated in detail in Fig. 16. In the bottom of the fountain is placed the usual form of regulating-plate 98, seated in the ordinary way in grooves in the side walls of the fountain; but this plate in my improved fountain, instead of bearing upon the distributing-wheel, bears upon the supplemental returning-wheel 95, in substantially the same manner, however, as it has heretofore been used in connection with the ink-distributing wheel. This plate may be set at the desired proximity to the wheel 95 by means of set-screw 99. To regulate the amount of ink which shall be carried from the well upon the wheel 54, I provide a gage-plate 100, which shall rest against the under side of the cover of the fountain and have projecting through a slot in said cover a nut, as 101, through which set-screw 102, located upon said cover, shall pass. By this set-screw the gage-plate 100 may be moved backward and forward, as desired. It is preferably notched at the end bearing upon the wheel 54. Wheels 54 and 95 fit closely the sides of the slit in which they turn. Any excess of ink left upon the wheel 54 after engagement with the inking-wheel is returned to the fountain by the wheel 95. This wheel, as shown, rotates at the same speed as the wheel 54; but with thin inks it is desirable to rotate it faster. The cover of the ink-well is shown as screwed in place, but obviously it might be clamped in place by any usual removable clamp.

In constructing an addressing-machine with but one cylinder or form-carrier, said form-carrier may be mounted substantially as the one shown in operation and mounted on a fixed support, the remaining form-carriers being simply omitted. The machine, as represented, is so constructed that each form-carrier shall bear fourteen hundred and forty forms or addresses, making the capacity of the machine eighty-six hundred and forty, which is sufficient for most of the mail editions of our daily papers. The capacity of such a machine, however, is unlimited, since the form-carriers may be made of any length desired and any number of them may be mounted upon the same rotary support.

The forms from which the printing is done I have shown as stereotype-forms, provided with some suitable means for securing them in the reciprocating form holders or seats 5. They may, however, be of any other form and may consist of type clamped in a suitable holder such as can be held in a reciprocating seat. At any time when an address is to be dropped from the list it is an easy matter to withdraw the form bearing it and insert another in its place by the use of the tool shown in Fig. 12, or by some other suitable means, and if anything should happen to the form holders or seats, or it should be necessary to replace one or more of them, the frames carrying the same may be easily removed from the drums by withdrawing the screws 4.

Many changes may be made in the construction, formation, and arrangement of the several parts constituting my addressing-machine without departing from the spirit of my invention, which is exemplified in the apparatus illustrated and described.

What I claim as my invention is—

1. In an addressing machine, the combination with a rotating reciprocating impression roller, of progressively moving address forms reciprocating laterally as to the line of movement.

2. In an addressing machine, the combination with a rotating reciprocating impression roller, of address forms, and means for feeding wrapping paper between said platen and forms.

3. In an addressing machine, the combination with a rotating intermittently reciprocated impression roller of address forms intermittently reciprocated and advanced while in co-operation with said roller.

4. In an addressing machine, the combination with the frame thereof, of arms pivoted thereon, a shaft journaled in the free ends of said arms, an impression roller on said shaft, springs for swinging said arms in one direction, cams upon said shaft, and rollers mounted upon the frame of the machine and co-operating with said cams to move the impression roller in opposition to said springs.

5. In an addressing machine, the combination with a rotary form carrier having a progressive longitudinal movement, of a succession of forms arranged in a spiral line thereon and each individually movable, means for automatically rotating said carrier and means located within it for successively reciprocating said forms as the carrier progresses.

6. In an addressing machine, the combination with a cylindrical form carrier or drum having a progressive longitudinal movement, of a series of forms arranged in a spiral line about it from end to end thereof and each independently movable, a spring for returning each to its normal position, and means fixed within the carrier for successively protruding each form beyond the others.

7. In an addressing machine, the combination with a rotating drum having an automatic progressive longitudinal movement, of individually movable address forms mounted thereon, and means within the drum and fixed upon the shaft thereof for successively reciprocating said forms as each arrives at a fixed point.

8. In an addressing machine, the combination with a fixed screw-threaded shaft, of a drum mounted to rotate thereon as a nut, means for rotating the drum, address forms in the periphery of the drum each individually movable beyond the surface of the others, and means upon said shaft for successively protruding each form beyond the others as the drum rotates.

9. In an addressing machine, the combination with a shaft having a cam thereon, a hollow screw-threaded shaft fixed in a suitable bearing and serving as a bearing for the cam-carrying shaft, a rotary drum having a nut in one end turning upon the screw-threaded shaft, and address forms movably mounted in the surface of said drum and provided with means for successively engaging said cam for the purpose specified.

10. In an addressing machine, the combination with a fixed screw-threaded shaft, a hollow drum mounted thereon and provided with a nut fitted to said thread, means for rotating the drum, address forms spirally and movably mounted in the surface of the drum, and an adjustable cam within the drum for successively protruding each form beyond the surface of the others.

11. In an addressing machine, the combination with a screw-threaded shaft fixed in a suitable bearing, another shaft in line there with mounted to rotate in a suitable bearing, a drum mounted upon said shafts, and having a nut engaging the screw-threaded shaft and engaging the rotary-shaft by means of a groove and spline, address forms mounted upon said drum, and means for printing therefrom successively.

12. In an addressing machine, the combination with a shaft provided with a cam, a hollow screw-threaded shaft on one end of the cam-shaft and fixed rigidly in a suitable bearing, another hollow shaft on the other end of the cam shaft and mounted to rotate in a suitable bearing, a drum mounted upon said shafts and engaging the screw-threaded shaft by means of a nut and the rotary-shaft by means of a groove and spline, and address forms movably mounted in said drum and successively protruded by means of said cam.

13. In an addressing machine, the combination with a shaft provided with a cam, means for adjusting said cam, a hollow screw-threaded shaft upon one end of the cam-shaft and fixed in a suitable bearing, a hollow shaft upon the other end of the cam-shaft and mounted to rotate in a suitable bearing and provided with a ratchet mechanism for intermittently rotating it, and an address carrying drum mounted by a screw-thread upon the threaded-shaft and by a groove and spline upon the rotary-shaft.

14. In an addressing machine, the combination with a rotating longitudinally progressing drum, of address forms mounted therein in close proximity to one another on all sides and extended end to end in a close spiral about the drum from one head thereof to the other, and means within the drum and fixed upon the shaft thereof for successively protruding each form beyond the others and retaining it in that position while the drum rotates the length of a form.

15. The combination with the drum provided with slots extending longitudinally of its periphery, of a series of reciprocating seats in each slot located side-by-side against one another and so arranged that they shall succeed each other in successive slots in a spiral about the drum, each seat being adapted to hold an address form, and springs for holding the seats in the slots.

16. The combination with the drum heads, of a series of racks extending from head to head and provided with end pieces of varying thicknesses, as and for the purpose set forth.

17. The combination with the drum and the clamping seats secured therein, of the address forms held in said seats and provided with screw-threaded sockets to receive a tool for removing them.

18. In an addressing machine, the combination of a series of form carriers mounted upon a common support, a number of address forms mounted in succession upon each carrier, mechanism for automatically moving said support intermittently to bring each carrier successively into the printing position, and means for automatically moving each carrier while in that position until its forms have been successively printed from.

19. In an addressing machine, the combination with a movable support, of rotary form carriers mounted thereon, means for rotating each form carrier until all its forms have been printed from, and means for automatically shifting said support to replace the carrier just printed from by another.

20. In an addressing machine, the combination with a rotating support, of longitudinally movable rotating form-carriers mounted thereon.

21. In an addressing machine, the combination with a rotating support provided with longitudinally extending screw-threaded shafts, a rotating cylinder on each shaft provided with a nut turning on said screw-thread, and address forms mounted upon said cylinders.

22. In an addressing machine, the combination of a rotating support provided with screw-threaded shafts fixed in one end thereof and with rotary shafts in alignment therewith mounted in bearings in the other end thereof, cylindrical form carriers mounted on said shafts and each provided with a nut engaging a screw-threaded shaft and engaging a rotary shaft by means of a groove and spline, and means for printing from each form as they arrive successively at a certain point.

23. In an addressing machine, the combination with a rotary support, of rotary cylindrical form carriers mounted thereon to move longitudinally while rotating, and mechanism automatically operated by the movement of each cylinder to throw into gear the mechanism for rotating said support.

24. In an addressing machine, the combination with a rotary support, of rotary form carriers mounted thereon, step-by-step mechanism for rotating the carriers in succession, a detent for holding the support rigid while the carriers are in operation, and means operated by the carriers for releasing said detent and throwing into gear the rotating mechanism of said support.

25. The combination with the rotary support and its rotating longitudinally movable carriers, of the step-by-step mechanism for operating the carriers, the clutch mechanism for coupling said support to the motive power, and the detent operated by said mechanism to release the support as the coupling goes into operation.

26. In an addressing machine, the combination with the form carriers and their rotary support, of the clutch for throwing the latter into and out of rotation, reciprocating pins located in one head of said support, a detent ring upon said head whose notches coincide with said pins, a detent upon the clutch lever adapted to enter said notches and rest upon said pins, and cams upon the form carriers for operating upon the pins to throw the detent out of engagement with the ring and the clutch into gear.

27. In an addressing machine, the combination with the rotary support and the form carriers mounted thereon, of a ratchet wheel secured to the shaft of each carrier, a pawl mounted upon the frame of the machine, continuously operating mechanism for driving said pawl, and intermittently operating mechanism for rotating said support and bringing each of said ratchet wheels successively into co-operation with said pawl.

28. In an addressing machine, the combination with the rotary support and its rotary form carriers, of the motor gear idle upon the shaft of said support, a shaft mounted in the frame of the machine and carrying at one end a gear in mesh with the motor gear and a cam upon the other end, a lever pivoted to the frame of the machine and rocked by said cam, a rod reciprocated by said lever, and a pawl carried by said rod for rotating the form carriers.

29. In an addressing machine, the combination with the rotary support and the rotary form carriers mounted thereon, of ink fountains and inking wheels also mounted on said support, and means for producing co-operation between the inking wheels and the initial forms upon each carrier as the support rotates it into printing position.

30. In an addressing machine, the combination with the rotary support and the rotary form carriers mounted thereon, of ink fountains provided with inking wheels mounted in said support, gears connecting the wheels of each fountain to the gear on a shaft of the carrier and a rack upon the frame of the machine for rotating said gears as each carrier is moved into printing position.

31. In an addressing machine, the combination with the rotary support, its form carriers and co-operating inking mechanism, of a rack for rotating each carrier as it moves into printing position, and means for throwing said rack into an inoperative position as the last carrier is moved into printing position.

32. In an addressing machine, the combination with the automatically and intermittently movable rotary support and its form carriers, of projections upon the shaft of the support, and a bell whose hammer is operated by said projections as the form carriers are moved into printing position.

33. In an addressing machine, the combination with the support for the form carriers, of a rod extending from head-to-head thereof, an ink fountain secured to said rod, a bracket secured to the rod at the side of the fountain, and shafts journaled in bearings in said bracket and upon one of the heads of the support, inking wheels at one end of said shafts, and gears at the other rotated from a gear on the shaft of a form carrier.

34. In an addressing machine, the combination with the support for the form carriers, of a rod extending across said support, a seat clamped thereto, an ink fountain containing an inking wheel and clamped to said seat, a clutch member upon the shaft of the inking wheel, and an operating shaft for said wheel journaled in bearings on said support and carrying a clutch member for engagement with the other clutch member.

35. In an addressing machine, the combination with the rotary support and a form carrier thereon, of an invertible sealed ink fountain fixed to said support, an ink distributing wheel rotating therein and partially protruding therefrom, and means cooperating with said wheel for returning to the fountain the surplus ink left on said wheel.

36. An invertible sealed ink fountain having an ink distributing wheel rotating in the wall thereof, and means cooperating with said wheel for returning to the fountain the surplus ink left upon said wheel in whatever position the fountain may be.

37. An ink fountain, having a distributing wheel rotating in a slit in the wall thereof, and an ink returning wheel also rotating in said slit at the return side of the distributing wheel.

38. An invertible sealed ink fountain having an ink distributing wheel rotating in a closely fitting slit in the wall thereof, and a second wheel also mounted to rotate in said slit and co-operating with the returning side of the distributing wheel to return to the fountain any ink remaining upon the latter.

39. An invertible sealed ink fountain having a distributing and a returning wheel mounted in a wall thereof, and provided with adjustable gages for regulating the amount of ink carried out by said wheels.

40. The combination with a form carrier and its ratchet wheel, of the cam 33, the rod reciprocated thereby, the pawl pivoted to said rod, the rocking roll resting upon the web of paper passing through the machine, and a connection from said roll to the pawl for withdrawing the same from the ratchet wheel when the paper breaks.

Signed at New York, in the county of New York and State of New York, this 23d day of February, A. D. 1895.

DANIEL WRIGLEY.

Witnesses:
WM. H. CAPEL,
HENRY T. HIRSCH.